United States Patent Office 3,585,215
Patented June 15, 1971

3,585,215
FORMYL CYCLOPENTA (C) PYRANS AND AMINO SUBSTITUTED COMPOUNDS
Peter Willibrord Thies, Hannover, Germany, assignor to Kali-Chemie Aktiengesellschaft, Hannover, Germany
No Drawing. Filed Oct. 4, 1968, Ser. No. 765,003
Int. Cl. C07d 7/32
U.S. Cl. 260—345.2                                 6 Claims

ABSTRACT OF THE DISCLOSURE

Formyl cyclopenta(c)pyrans, and the amidino, carbamoyl and thiocarbazone thereof. The compounds are chemotherapeutic agents, useful in the treatment of microbial infections, analgesic and sedatives.

---

The invention concerns formyl cyclopenta(c)pyrans, 100 γ/ml. was fully bacteriostatic. The following bacteria were tested: *St. P. aureus* (Micrococcus), s.g. 511 (Micrococcus), *B. coli* 126 (Escherichia), *B. proteus* (pr. vulgaris), *Ps. aeruginosa* (Pseudomonas), *M. phlei* (Mycobacterium), *M. smegmatis* (Mycobacterium), *M. lacticola* (Mycobacterium).

Quite noteworthy is the high potency of the pyrans and their bacteriostatic effect on bacteria of the Mycobacterium and Proteus type since these microorganisms are resistant to so many common antibiotics and chemotherapeutics. The pyrans of the invention can thus be used in the control of bacteria infections in humans and animals.

The pyrans of the invention are also effective on the central nervous system of warm blooded animals, in particular they show spasmolytic action, analgesic and sedative effect, they are blood pressure depressants. The toxicity of the pyrans is low.

In the following tests, standard methods are used.

| Substituents | | Toxicity, $LD_{50}$ in mg./kg., tested on white mice | | | Effect on central nervous system, $ED_{50}$ in mg./kg. | | | |
|---|---|---|---|---|---|---|---|---|
| Compound A | Compound R | i.v. | i.p. | p.o. | Spasmolytic, i.p. | Analgesic, i.p. | Sedative, i.p. | Blood pressure depressant, i.v. |
| =N—NH—CSNH$_2$ | —OCOCH$_3$ | | 8509 | >1,500 | | | <316 | |
| =N—NH—CNHNH$_2$* | Same as above | 106 | 84 | >1,000 | | | | 2.6–4.6 |
| Same as above | —OCOCH$_2$CH(CH$_3$)$_2$ | | 560 | >1,500 | 15 | 15 | | |
| =N—NH—CSNH$_2$ | Same as above | | 680 | >1,500 | 68 | 68 | | |

\* Tested as the hydrochloride.

the amidino, carbamoyl and thiocarbazide derivatives thereof, and the possible addition salts thereof.

The compounds have the general formula

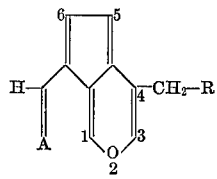

in which

R is an aliphatic acyloxy radical,
A is oxygen or the radical

in which $R_1$ is hydrogen, phenyl, dinitrophenyl or another aromatic residue, or the residue —CO—NH$_2$, —CS—NH$_2$ or —CNH—NH$_2$ with the exception of the compounds where R is —O—CO—CH$_3$, and A is oxygen or =N—NH—dinitrophenyl.

Typical acyloxy radicals RCOO— in which R is a lower alkyl include acetyloxy, butyryloxy, valeryloxy, caproyloxy, and the like.

The pyrans of the invention are effective chemotherapeutic agents especially as bacteriostatic agents useful in the control of various types of bacterial infections.

In standard tests (serial dilution method) typical compounds of the invention were bactericidal against representative gram-positive and gram-negative bacteria. The high potency and scope of antimicrobial spectrum is demonstrated by tests wherein concentrations lower than In view of their biological effect the pyrans of the invention[1] are useful as therapeutic agents, as analgesics, spasmolytics, and sedatives.

The process of preparation of the pyrans of the invention comprises reacting an epoxy tetrahydro cyclopenta (c)pyran of the general Formula II

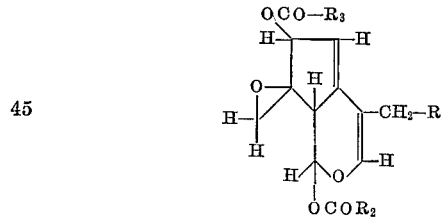

in which $R_2$ and $R_3$ are hydrogen, alkyl or acyloxy alkyl and R is acyloxy to form the corresponding 7-formyl cyclopenta(c)pyran of Formula I. Suitable alkyl groups include lower alkyl from 1 to 4 carbon atoms, including methyl, n-propyl and isobutyl.

The reaction of the compounds of Formula II is carried out in accordance with known methods with strong acids or thermal conversion in the presence of a weak acid to give the pyrans of Formula I wherein A is oxygen. These compounds are further condensed in an acid medium with a hydrazine of the general formula H$_2$N—NH—R$_1$ in which $R_1$ has the definition stated above to the corresponding hydrazone of Formula I. The products are obtained as well defined red crystallinze products.

---

[1] Either each compound as such or mixtures of the compounds.

The reaction is preferably carried out in the presence of a polar solvent such as chloroform, methanol or others, possibly in mixture with hydrocarbons. The reactions are advantageously carried out by reacting molar quantities of the individual reaction components. The temperature of reaction is generally 0° to 90° C. or higher.

The methods for obtaining compounds of Formula II are disclosed in U.S. patent application Ser. No. 676,667 filed Sept. 27, 1967, U.K. Pats. 1,021,216, 1,021,217 and Belgian Pat. No. 675,165, and German patent disclosures 1,191,515 and 1,223,993.

The following examples are illustrative of the invention.

EXAMPLE 1

A solution of 10 g. of a compound of Formula II, $C_{22}H_{30}O_8$, in which $R_2=-CH_2-CH(CH_3)_2$, $R_3=$methyl, and $R_4=-OCO-CH_2-CH(CH_3)_2$ in 20 ml. of chloroform is reacted while cooling with a solution of 20 g. trichloro acetic acid in 50 ml. of chloroform, with stirring. The solution became greenish blue.

After 10 minutes ice water is added, the chloroform phase is separated, washed free of acid with a 1% sodium carbonate solution, dried over sodium sulfate and concentrated under vacuum. The yellow-brownish oily residue is taken up in n-heptane and is passed on an aluminum oxide ($Al_2O_3$) chromatography column. The column had previously been partially inactivated in accordance with German Pat. 1,223,993 or U.K. Pat. No. 1,021,217 with n-heptane to which 1% acetic acid had been added. These patents are incorporated herein by reference.

There is eluted with n-heptane a yellow zone. The yellow zone-containing fractions are combined, concentrated and the yellow oily residue is dissolved in some ether-hexane, and then crystallizes at about −20° C.

Upon recrystallization from hexane-ether, the product is 1.25 g. of yellow needles of the compound $C_{15}H_{16}O_4$. The product is identified as 4-isovaleroxymethyl-7-formyl-cyclopenta(c)pyran which has the following characteristics:

M.P. 36–37° C. molecular weight: 260.3.

Calculated (percent): C, 69.22; H, 6.20. Found (percent): C, 69.04; H, 6.25.

The pyran is an effective bactericide.

EXAMPLE 2

0.4 g. of thiosemicarbazide is dissolved in 3 ml. of a 35% acetic acid while heating. 1 g. of 4-isovaleroxymethyl-7-formyl-cyclopenta(c)pyran is dissolved in 5 ml. 80% acetic acid.

As the two solutions are mixed, the solution turned dark red and a reddish-brown crystalline material precipitated. Upon the addition of a few drops of acetic acid, the solution turns a clear dark red from which there is precipitated a fine crystalline dark red product upon the addition of some water. The product is a fine uniform crystalline dark red material. The product is filtered by suction, washed with water and dried under vacuum. The product is identified as 4-isovaleroxymethyl-7-formyl-cyclopenta(c)pyran thiosemicarbazone, $C_{16}H_{19}O_3N_3S$, M.P. 157–159° C. Yield: 1.03 g.=78% of theory.

The pyran is an effective bactericide.

EXAMPLE 3

Following the procedure of Example 2, there is prepared 4-acetoxymethyl-7-formyl-cyclopenta(c)pyran thiosemicarbazone from the corresponding 4-acetoxymethyl-7-formyl-cyclopenta(c)pyran and thiosemicarbazide. The dark red crystalline product $C_{13}H_{13}O_3N_3S$ has a M.P. of 212° C. (before decomposition). The pyran is an effective bactericide.

EXAMPLE 4

0.1 g. of 4-isovaleroxymethyl-7-formyl-cyclopenta(c) pyran are dissolved in 0.5 ml. of methanol and the solution is brought to reaction while heating with 0.053 g. of amino-guanidine hydrogen carbonate dissolved in 0.1 ml. of water acidified with a few drops of hydrogen chloride. Upon reaction the solution became immediately dark red and after a few minutes a fine, dark red crystalline product precipitated out of solution. The precipitate after dilution with water is suction filtered and after washing with water and ether, the product is dried under vacuum. The product 0.105 g. of 4-isovaleroxymethyl-7-formyl-cyclopenta(c)pyran guanylhydrazone hydrochloride has a formula of $C_{16}H_{20}O_3N_4 \cdot HCl$ is obtained in a yield of 77.6% of theory and has the following characteristics:

M.P. >200° C. (before decomposition). Molecular weight: 352.83.

Calculated (percent): C, 54.47; H, 6.00; N, 15.88; Cl, 10.05. Found (percent): C, 54.43; H, 6.13; N, 15.86; Cl, 9.90.

The pyran is an effective bactericide.

EXAMPLE 5

0.748 g. of aminoguanidine hydrogen carbonate is suspended in 1.4 ml. of water and upon slow addition of 0.86 ml. of 6.38 N HCl is brought into solution.

1.09 g. of 4-acetoxymethyl-7-formyl-cyclopenta(c)-pyran dissolved in 7 ml. methanol and added at 50° C. to the acid solution of aminoguanidine. The solution became dark red immediately and upon cooling a dark red crystalline precipitate came out which is filtered, washed with water and ether, and then dried under vacuum. The product 1.2 g. of 4-acetoxymethyl-7-formyl-cyclopenta(c)pyran guanylhydrazone hydrochloride has a formula $C_{13}H_{14}O_3N_4 \cdot HCl$, is obtained in a yield of 84.3% of theory and has the following characteristics:

M.P. >250° C. (before decomposition). Molecular weight: 310.74.

Calculated (percent): C, 50.25; H, 4.86; N, 18.03; Cl, 11.41. Found (percent): C, 50.25; H, 4.98; N, 17.71; Cl, 11.47.

The pyran is an effective bactericide.

EXAMPLE 6

0.218 g. (1/1,000 mol) of 4-acetoxymethyl-7-formyl-cyclopenta(c)pyran is dissolved in 5 ml. of a 50% ethanol with slight warming and reacted with a solution of 0.112 g. of semicarbazide hydrochloride in 1 ml. of 50% ethanol.

The mixture became immediately dark red and upon slight warming a crystalline precipitate came out. Upon dilution with water and cooling to 0–5° C. additional precipitation of crystalline material occurred. The product is filtered under suction, washed with water and ether and dried at 100° C. The product, 0.203 g. of $$C_{13}H_{13}O_4N_3$$

4-acetoxymethyl-7 - formyl - cyclopenta(c)pyran semicarbazone is obtained in a yield of 74% of theory and has the following characteristics:

M.P. 210–212° C. (before decomposition). Molecular weight: 275.26.

Calculated (percent): C, 56.72; H, 4.76; N, 15.26. Found (percent): C, 57.20; H, 5.00; N, 15.44.

The pyran is an effective bactericide.

EXAMPLE 7

0.1 g. of 4-isovaleroxymethyl-7-formyl-cyclopenta(c) pyran is dissolved in 3 ml. of 50% acetic acid and then reacted with a solution of 0.048 g. of semicarbazide hydrochloride in 3 ml. of 50% acetic acid at 20° C. The condensation took place immediately as the solution became red. After some minutes, the solution is diluted with water till hazy. Upon cooling, a fine crystalline, dark red precipitate came out which is then filtered, washed with water and dried under vacuum at 100° C. The product, 0.084 g. of $C_{16}H_{19}O_4N_3$, 4-isovaleroxymethyl - 7-formyl-cyclopenta(c)pyran semicarbazone, is obtained in a yield of 69.0% of theory and has the following characteristic:

M.P. 220° C. (before decomposition).

The pyran is an effective bactericide.

EXAMPLE 8

The procedure of Example 1 is followed to obtain 4-acetoxymethyl-7 - formyl - cyclopenta(c)pyran from the corresponding 4-acetoxy substituted compound of Formula II. The pyran is an effective bactericide.

Since the compounds of Formula I wherein A is

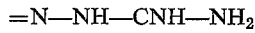

have at least one amino group, they may readily be converted into non-toxic, pharmacologically acceptable acid addition salts by customary methods. In addition to the hydrochloric acid addition salts, which are illustrated in the above examples, other non-toxic, pharmacologically acceptable acid addition salts are, for example, those formed with hydrobromic acid, sulfuric acid, phosphoric acid, acetic acid, tartaric acid, ascorbic acid and the like.

The compounds of the invention can be administered in a wide variety of therapeutic doses in conventional vehicles as for example by oral administration in the form of a capsule or tablet as well as by intravenous injections. The dosage of the product may be varied over a wide range as for instance in the form of capsules or scored tablets containing 1–50 mg. or even higher dosages of the active ingredients of the invention. Compressed tablets, pills or other desired unit dosages can be prepared to incorporate the compounds of the invention by conventional methods. It is also within the scope of this invention to combine two or more of the compounds of this invention in a unit dosage form or to combine one or more of the compounds of the invention with other known therapeutic agents.

When the compounds of the invention are primarily designed as bacteriostatic compositions for controlling bacterial infections the product may be dispersed with an inert carrier, preferably finely-divided solids, and employed as dusts. Also such mixtures may be dispersed in water with the aid of a wetting agent and the resulting aqueous suspensions used as sprays. The products of the invention may also be employed in oil as oil and water emulsions or as water dispersions with or without the aid of dispersing or emulsifying agents.

The standard tests which are used for evaluation of the compounds are known in the literature. They are incorporated herein by reference. See, for instance, K. H. Wallhäuser und H. Schmidt, Georg Thieme Verlag Stuttgart, 1967, Strilisation, Desinfektion, Konservierung, Chemotherapie, p. 420.

The known method suitable for preparation of the pyrans in which A represents oxygen and the condensation of the products to form the hydrazino derivatives are adequately described in the literature which is incorporated herein by reference. See, for instance, Tetrahedron 24 (1968), p. 313.

I claim:

1. A compound of the formula

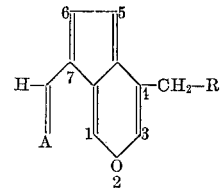

in which R is a lower alkanoyl oxy radical, A is oxygen or the radical $=N-NH-R_1$ in which $R_1$ is hydrogen, phenyl, dinitrophenyl or the residue $-CONH_2$, $CS-NH_2$ and $-CNH-NH_2$, excluding the compounds in which R is acetoxy and A is oxygen or $=N-NH-$ dinitrophenyl.

2. A compound of claim 1 in which R is acetoxy or isovaleroxy.

3. A compound of claim 1 in which A is

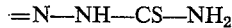

4. The compound of claim 1 in which A is oxygen and R is isovaleroxy.

5. A compound of claim 1 in which A is the radical $=N-NH-R_1$ in which $R_1$ is $-CS-NH_2$,

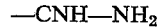

or $-CO-NH_2$ and R is isovaleroxy.

6. A pharmaceutically acceptable salt of the compound of claim 1 wherein A is the radical

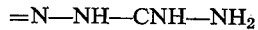

and R is acetoxy or isovaleroxy.

References Cited

UNITED STATES PATENTS 3,422,090  1/1969  Thies et al. _____ 260—345.2X
3,485,851  12/1969  Thies _____ 260—345.2

JOHN M. FORD, Primary Examiner

U.S. Cl. X.R.

424—283